United States Patent
Jha et al.

(10) Patent No.: US 11,651,050 B2
(45) Date of Patent: May 16, 2023

(54) METHODS AND SYSTEMS TO PREDICT PARAMETERS IN A DATABASE OF INFORMATION TECHNOLOGY EQUIPMENT

(71) Applicant: VMware, Inc., Palo Alto, CA (US)

(72) Inventors: Chandrashekhar Jha, Bangalore (IN); Jobin George, Bangalore (IN); Prateek Sahu, Austin, TX (US); Kumar Gaurav, Bangalore (IN); Jusvinder Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 359 days.

(21) Appl. No.: 16/866,664

(22) Filed: May 5, 2020

(65) Prior Publication Data
US 2020/0265111 A1    Aug. 20, 2020

Related U.S. Application Data

(63) Continuation of application No. 15/898,238, filed on Feb. 16, 2018, now Pat. No. 10,678,888.

(51) Int. Cl.
  *G06F 17/18*  (2006.01)
  *G06Q 10/063*  (2023.01)
  *G06F 17/11*  (2006.01)
  *G06F 16/28*  (2019.01)

(52) U.S. Cl.
  CPC ............ *G06F 17/18* (2013.01); *G06F 16/285* (2019.01); *G06F 17/11* (2013.01); *G06Q 10/063* (2013.01)

(58) Field of Classification Search
  CPC ........ G06F 17/18; G06F 16/285; G06F 17/11; G06Q 10/063

USPC ......................................................... 707/737
See application file for complete search history.

(56) References Cited

U.S. PATENT DOCUMENTS

| | | | |
|---|---|---|---|
| 11,196,800 B2 * | 12/2021 | Suresh | G06F 17/18 |
| 2010/0114865 A1 * | 5/2010 | Gupta | G06F 16/217 |
| | | | 707/E17.017 |
| 2014/0149412 A1 * | 5/2014 | Nakamura | G06V 20/35 |
| | | | 707/737 |
| 2015/0199010 A1 * | 7/2015 | Coleman | A61B 5/0022 |
| | | | 345/156 |
| 2015/0227863 A1 * | 8/2015 | Sukuta | G16C 20/70 |
| | | | 705/7.11 |
| 2015/0242589 A1 * | 8/2015 | Neumann | G06F 17/18 |
| | | | 703/2 |
| 2016/0350377 A1 * | 12/2016 | Marecek | G06F 16/2465 |
| 2017/0124074 A1 * | 5/2017 | Cama | G06F 16/686 |
| 2019/0018821 A1 * | 1/2019 | Ormont | G06N 20/20 |

* cited by examiner

*Primary Examiner* — Giovanna B Colan

(57) ABSTRACT

Methods and systems predict parameters in a dataset of an identified piece of ("information technology") IT equipment. An automated method identifies datasets IT equipment in a same category of IT equipment as a piece of IT equipment identified as having incomplete dataset information. Each dataset of IT equipment parameters is used to construct generalized linear models of different classes of IT equipment within the category of IT equipment. The class of the identified IT equipment is determined. A predicted equipment parameter of incomplete information of the identified piece of IT equipment is computed using the generalized linear model associated with the class. The predicted equipment parameter can be used to complete the dataset of the identified piece of IT equipment.

15 Claims, 20 Drawing Sheets

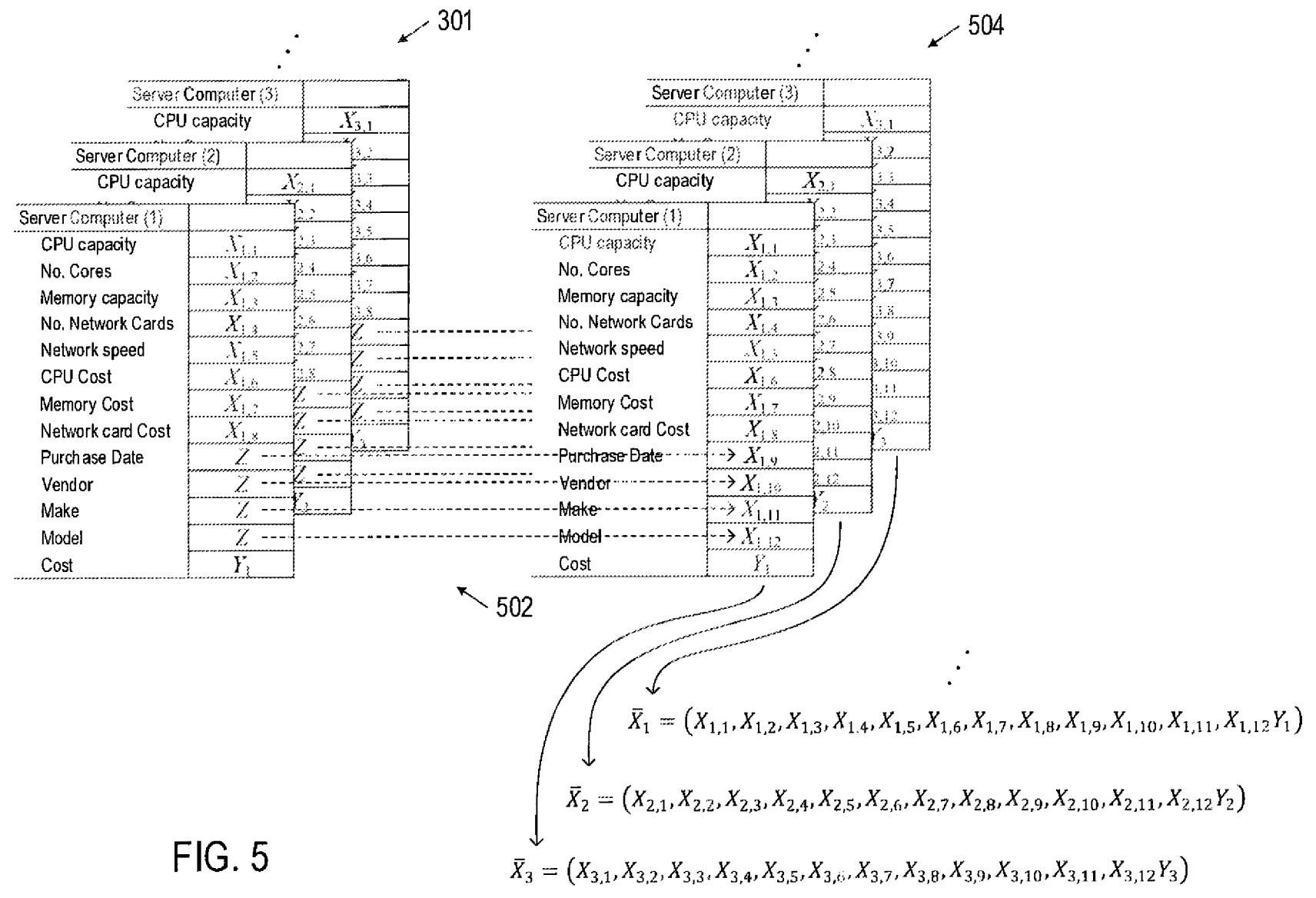

$$\bar{X}_1 = (X_{1,1}, X_{1,2}, X_{1,3}, X_{1,4}, X_{1,5}, X_{1,6}, X_{1,7}, X_{1,8}, X_{1,9}, X_{1,10}, X_{1,11}, X_{1,12}, Y_1)$$

$$\bar{X}_2 = (X_{2,1}, X_{2,2}, X_{2,3}, X_{2,4}, X_{2,5}, X_{2,6}, X_{2,7}, X_{2,8}, X_{2,9}, X_{2,10}, X_{2,11}, X_{2,12}, Y_2)$$

$$\bar{X}_3 = (X_{3,1}, X_{3,2}, X_{3,3}, X_{3,4}, X_{3,5}, X_{3,6}, X_{3,7}, X_{3,8}, X_{3,9}, X_{3,10}, X_{3,11}, X_{3,12}, Y_3)$$

FIG. 5

| Equipment(1) | |
|---|---|
| Regressor | $X_{1,1}$ |
| Regressor | $X_{1,2}$ |
| Regressor | $X_{1,3}$ |
| ⋮ | ⋮ |
| Regressor | $X_{1,M}$ |
| Response | $Y_1$ |

| Equipment(2) | |
|---|---|
| Regressor | $X_{2,1}$ |
| Regressor | $X_{2,2}$ |
| Regressor | $X_{2,3}$ |
| ⋮ | ⋮ |
| Regressor | $X_{2,M}$ |
| Response | $Y_2$ |

· · ·

| Equipment(L) | |
|---|---|
| Regressor | $X_{L,1}$ |
| Regressor | $X_{L,2}$ |
| Regressor | $X_{L,3}$ |
| ⋮ | ⋮ |
| Regressor | $X_{L,M}$ |
| Response | $Y_L$ |

FIG. 12A $$h(\mu_1) = \beta_0 + \beta_1 X_{1,1} + \beta_2 X_{1,2} + \ldots + \beta_M X_{1,M}$$
$$h(\mu_2) = \beta_0 + \beta_1 X_{2,1} + \beta_2 X_{2,2} + \ldots + \beta_M X_{2,M}$$
$$h(\mu_3) = \beta_0 + \beta_1 X_{3,1} + \beta_2 X_{3,2} + \ldots + \beta_M X_{3,M}$$
$$\vdots$$
$$h(\mu_L) = \beta_0 + \beta_1 X_{L,1} + \beta_2 X_{L,2} + \ldots + \beta_M X_{L,M}$$

FIG. 12B $$h(\bar{\mu}) = \bar{X}\bar{\beta} = \begin{bmatrix} h(\mu_1) \\ h(\mu_2) \\ h(\mu_3) \\ \vdots \\ h(\mu_L) \end{bmatrix} = \begin{bmatrix} 1 & X_{1,1} & X_{1,2} & \cdots & X_{1,M} \\ 1 & X_{2,1} & X_{2,2} & \cdots & X_{2,M} \\ 1 & X_{3,1} & X_{3,2} & \cdots & X_{3,M} \\ \vdots & \vdots & \vdots & & \vdots \\ 1 & X_{L,1} & X_{L,2} & \cdots & X_{L,M} \end{bmatrix} \begin{bmatrix} \beta_0 \\ \beta_1 \\ \beta_2 \\ \vdots \\ \beta_M \end{bmatrix}$$

FIG. 12C

METHODS AND SYSTEMS TO PREDICT PARAMETERS IN A DATABASE OF INFORMATION TECHNOLOGY EQUIPMENT

CROSS-REFERENCE TO RELATED APPLICATION

This application is a continuation of application Ser. No. 15/898,238, filed Feb. 16, 2018.

TECHNICAL FIELD

This disclosure is directed to computational systems and methods for predicting parameters in a database of information technology equipment.

BACKGROUND

In recent years, enterprises have shifted much of their computing needs from enterprise owned and operated computer systems to cloud-computing providers. Cloud-computing providers charge enterprises for use of information technology ("IT") services over a network, such as storing and running an enterprise's applications on the hardware infrastructure, and allow enterprises to purchase and scale use of IT services in much the same way utility customers purchase a service from a public utility. IT services are provided over a cloud-computing infrastructure made up of geographically distributed data centers. Each data center comprises thousands of server computers, switches, routers, and mass data-storage devices interconnected by local-area networks, wide-area networks, and wireless communications.

Because of the tremendous size of a typical data center, cloud-computing providers rely on automated IT financial management tools to determine cost of IT services, project future costs of IT services, and determine the financial health of a data center. A typical automated management tool determines current and projected cost of IT services based on a reference database of actual data center equipment inventory and corresponding invoice data. But typical management tools do not have access to the latest invoice data for data center equipment. Management tools may deploy web automated computer programs, called web crawling agents, that automatically collect information from a variety of vendor web sites and write the information to the reference database. However, agents are not able to identify errors in web pages and may not be up-to-date with the latest format changes to web sites. As a result, agents often write incorrect information regarding data center equipment to reference databases. Management tools may also compute approximate costs of unrecorded equipment based on equipment currently recorded in a reference database. For example, the cost of an unrecorded server computer may be approximated by computing a mean cost of server computers recorded in the reference database with components that closely match the components of the unrecorded server computer and assigning the mean cost as the approximate cost of the unrecorded server computer. However, this technique for determining the cost of data center equipment typically is unreliable with errors ranging from as low as 12% to as high as 45%. Cloud-computing providers and data center managers seek more accurate tools to determine cost of IT equipment in order to more accurately determine the cost of IT services and project future cost of IT services.

SUMMARY

Methods and system described herein may be used to predict parameters in a dataset of an identified piece of IT equipment stored in a reference library database. An automated method identifies datasets in the reference library database in the same category of IT equipment as a piece of IT equipment identified as having incomplete or inaccurate dataset information. Each dataset comprises configuration parameters, non-parametric information, and cost of each piece of IT equipment of a data center. The non-parametric information in each dataset is encoded into encoded parameters that represent the non-parametric information. The configuration parameters, encoded parameters, and cost of each piece of IT equipment in the category are identified as equipment parameters. Each set of equipment parameters corresponds to a data point in a multi-dimensional space. Clustering is applied to the data points to determine classes of IT equipment such that each piece of IT equipment in the category belongs to one of the classes. A generalized linear model is computed for each class of IT equipment based on the equipment parameters of the IT equipment in the class. Methods then determine the class of the identified piece of IT equipment as the minimum of squared distances between equipment parameters of the identified piece of IT equipment and the equipment parameters in each class. A predicted equipment parameter of the identified piece of IT equipment is computed using the generalized linear model associated with the class of IT equipment the identified piece of IT equipment belongs to. The predicted equipment parameter can be used to complete the dataset of the identified piece of IT equipment.

DESCRIPTION OF THE DRAWINGS

FIG. 5 shows the server computer data sets with non-parametric information replaced by encoded parameters.

FIG. 12A shows configuration and encoded parameters for sets of training data.

FIG. 12B-12C show systems of equations formed from the regressor parameters associated with the training data displayed in FIG. 12A.

DETAILED DESCRIPTION

Figure 1:
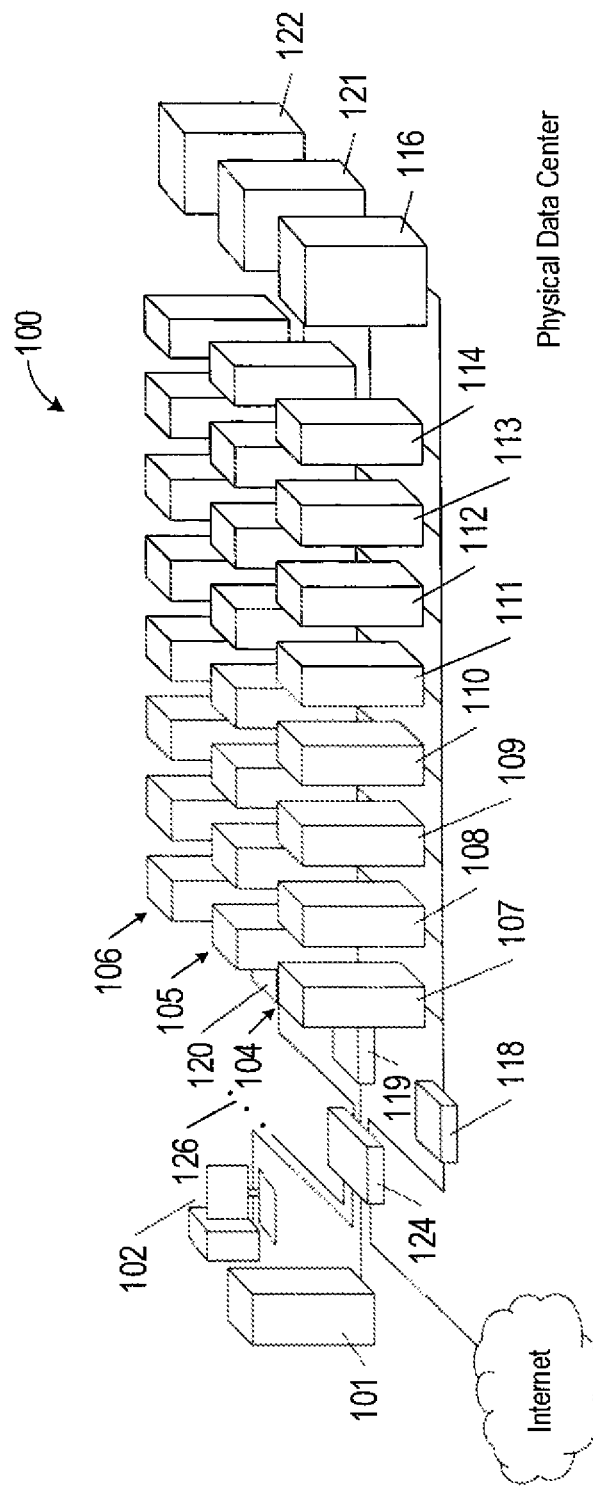
FIG. 1 shows a portion of an example data center.

FIG. 1 shows a portion of an example data center 100. The data center 100 includes a management server 101 and a PC 102 on which a management interface may be displayed to system administrators and other users. The data center 100 additionally includes server computers and mass-storage arrays interconnected via switches that form three local area networks ("LANs") 104-106. For example, the LAN 104 comprises server computers 107-114 and mass-storage array 116 interconnected via Ethernet or optical cables to a network switch 118. Network switches 119 and 120 each interconnect eight server computers and mass-storage storage arrays 121 and 122 of LANs 105 and 106, respectively. In this example, the data center 100 also includes a router 124 that interconnects the LANs 104-106 to the Internet, the virtual-data-center management server 101, the PC 102 and to other routers and LANs of the data center 100 (not shown) represented by ellipsis 126. The router 124 is interconnected to other routers and switches to form a larger network of server computers and mass-storage arrays.

Figure 2:
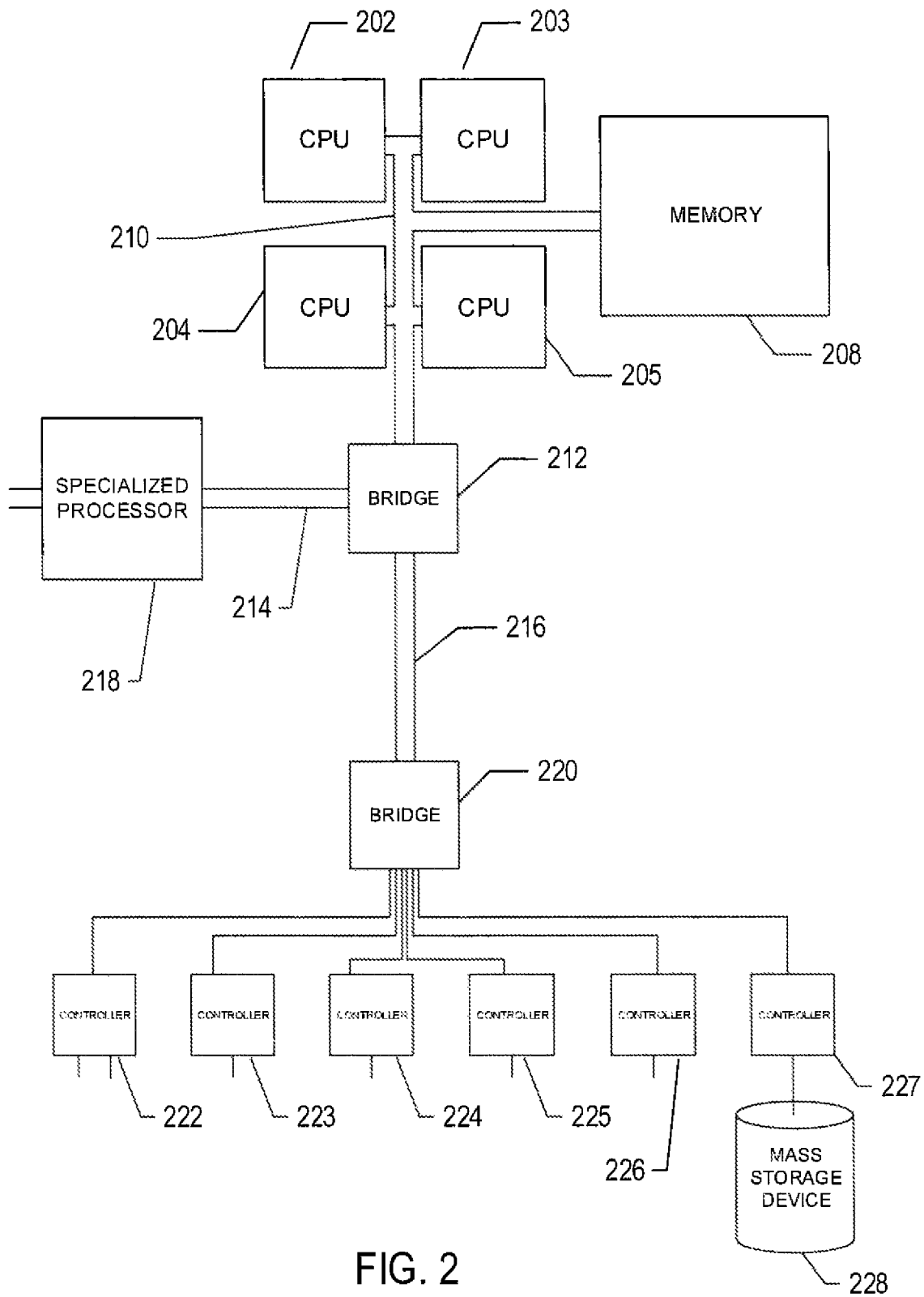
FIG. 2 shows a general architectural diagram for various types of computers.

There are many different types of computer-system architectures deployed in a data center. System architectures differ from one another in the number of different memories, including different types of hierarchical cache memories, the number of processors and the connectivity of the processors with other system components, the number of internal communications busses and serial links, and in many other ways. FIG. 2 shows a general architectural diagram for various types of computers. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational devices. It should be noted that computer-readable data-storage devices include optical and electromagnetic disks, electronic memories, and other physical data-storage devices.

Figure 3:
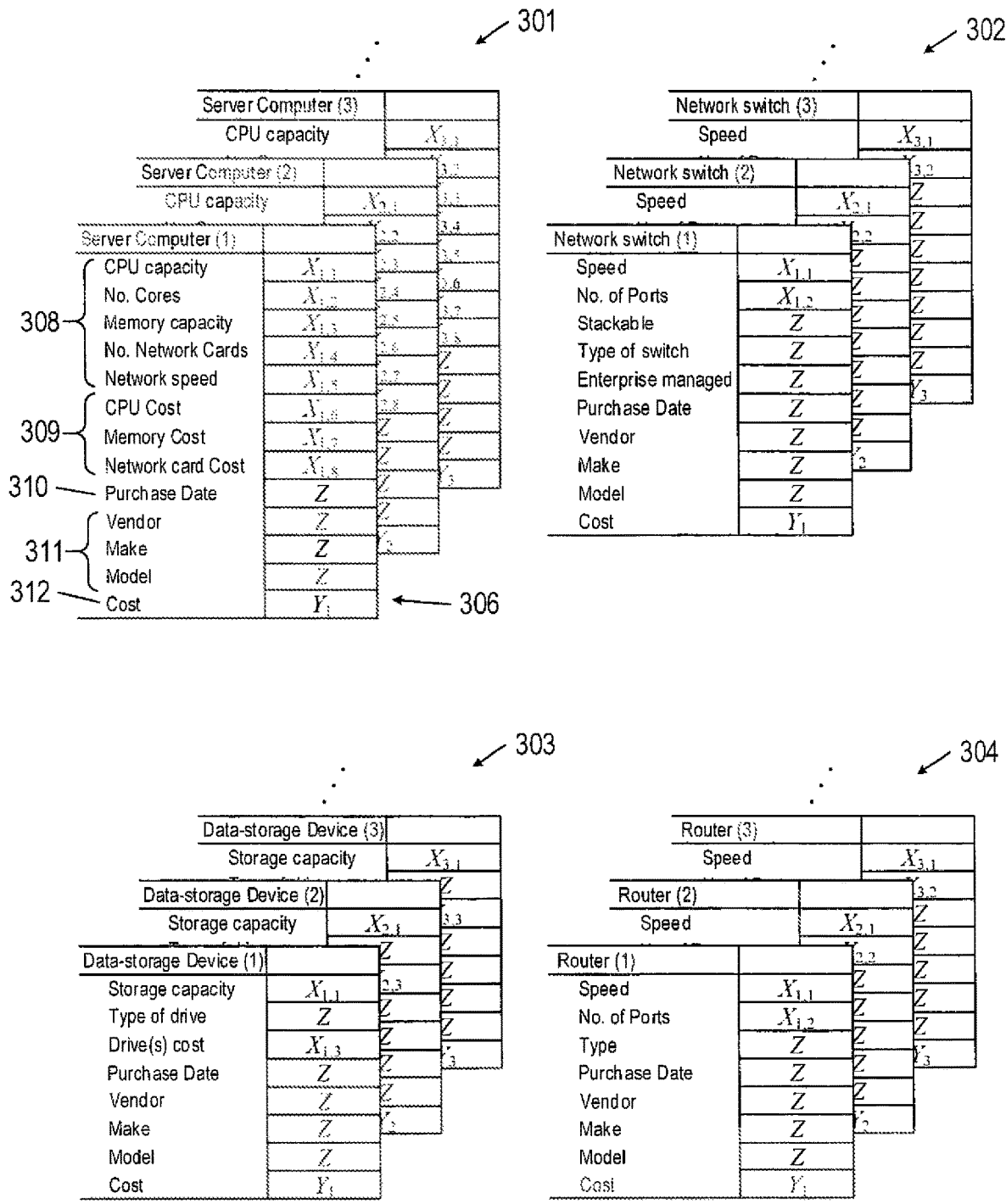
FIG. 3 shows example data sets of a reference library database of IT equipment deployed in a data center.

Data sets of component information, non-parametric information and costs associated with each piece of IT equipment deployed in a data center are stored in a reference library database. FIG. 3 shows example data sets of a reference library database of IT equipment deployed in a data center. In this example, the reference library database comprises server computer data sets 301, network switch data sets 302, data-storage device data sets 303, and router data sets 304. Note that, in practice, a reference library database may also include data sets for workstations, desktop computers, and any other IT equipment of the data center. Each data set corresponds to one piece of IT equipment deployed in the data center and comprises a list of components of the IT equipment, configuration parameters of components, cost of certain components, date or purchase, non-parametric information, and overall cost of the piece of IT equipment. For example, database table 306 comprises a list of components 308 and component costs 309 for Server Computer (1). The associated configuration parameters are denoted by $X_{n,m}$, where the subscript n represents the IT equipment index and the subscript m represents the data set entry index. For example, $X_{1,1}$ represents the numerical value of CPU capacity in bits per cycle and $X_{1,2}$ represents the number of cores in the CPU, such as 2, 4, 6, or 8 cores. Each data set also includes entries of non-parametric information denoted by Z. An entry of non-parametric information comprises textual descriptions or a combination of parameters, letters, and symbols. For example, the non-parametric information of the Server Computer (I) is a date or purchase 310, vendor name, make, and model 311. The total cost of a piece of IT equipment is denoted by $Y_n$.

A piece of IT equipment to be deployed in the data center or already deployed in the data center may have incomplete dataset information. The identified piece of IT equipment can be server computer, a workstation, a desktop computer, a network switch, or a router. Methods and system described below predict parameters in a dataset of the identified piece of IT equipment based on datasets of the same category of IT equipment stored in a reference library database. Datasets of IT equipment that are in the same category of IT equipment as the identified piece of IT equipment are determined. Non-parametric information entries in each dataset are identified and encoded into numerical values called "encoded parameters."

Figure 4:
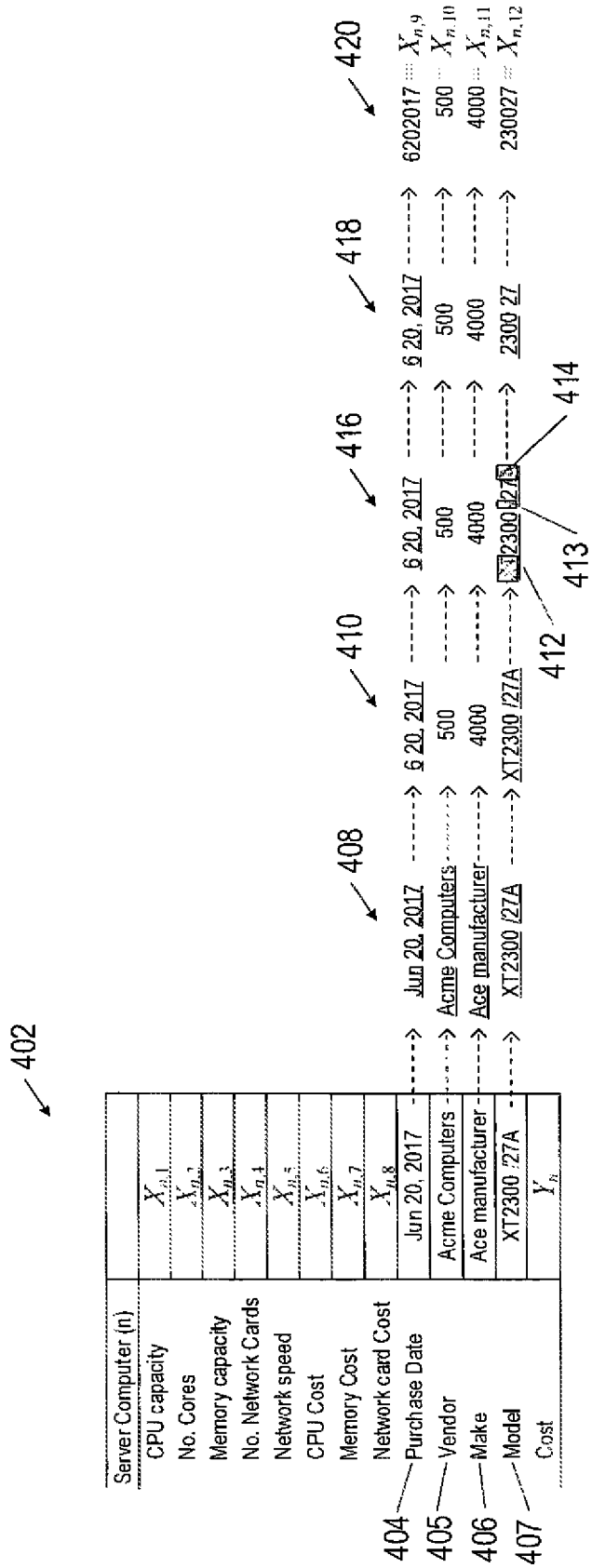
FIG. 4 shows an example of encoding non-parametric information of a server computer data set.

FIG. 4 shows an example of encoding non-parametric information of a server computer data set 402. Examples of non-parametric information are entered for the date of purchase 404, vendor 405, make 406, and model 407. Non-parametric entries are first tokenized by identifying non-parametric entries 408 comprising tokens separated by non-printed characters, called "white spaces." A token is a numerical character, non-numerical character, combination of numerical and non-numerical characters, and punctuation. Tokens are identified by underlining. Next, token recognition is applied to each token to identify any tokens that correspond to recognized proper names, such as the name of a vendor and name of a manufacture. Recognized tokens are replaced 410 with unique pre-selected numerical values. For example, a month name or abbreviation token, such as "Jun" in a date of purchase entry is replaced by the numerical value 6, the vendor name, "Acme Computers." is replaced by the numerical value 500, and the maker, "Ace manufacturer." is replaced by the numerical value 4000. Next, non-parametric characters in the unrecognized tokens are identified as indicated by hash-marked shading 412-414. The identified non-parametric characters are deleted 418. Finally, punctuation and white spaces are deleted to obtain numerical values 420 called encoded parameters. FIG. 4 and the description represent one or many techniques that may be used to encode non-parametric information into encoded parameters.

FIG. 5 shows the server computer data sets 301 of FIG. 3 with non-parametric information replaced by encoded parameters. Dashed lines 502 represent encoding applied to the non-parametric information of each server computer data set as described above with reference to FIG. 4, to obtain server computer data sets 504 with encoded parameters that represent corresponding non-parametric information. The thirteen configuration, cost, and encoded parameters form an ordered set of numerical values called a 13-tuple associated with a server computer. FIG. 5 shows the configuration, cost, and encoded parameters of the server computers (1), (2), and (3) represented by three 13-tuples denoted by $\vec{X}_1$, $\vec{X}_2$, and $\vec{X}_3$, respectively. Each 13-tuple of configuration, cost, and encoded parameters of a server computer is a point in 13-dimensional space. The configuration parameters, cost, and encoded parameters are called, in general, "equipment parameters."

In general, an M-tuple of equipment parameters associated with a piece of IT equipment corresponds to a data point in an M-dimensional space. Let N be the number of pieces of IT equipment of the same category deployed in a data center. The categories of IT equipment include server computers, workstations, routers, network switches, data-storage devices or any other type of equipment deployed in a data center. The M-tuples of V pieces of the IT equipment form N data points in the MA-dimensional space.

Figure 6:
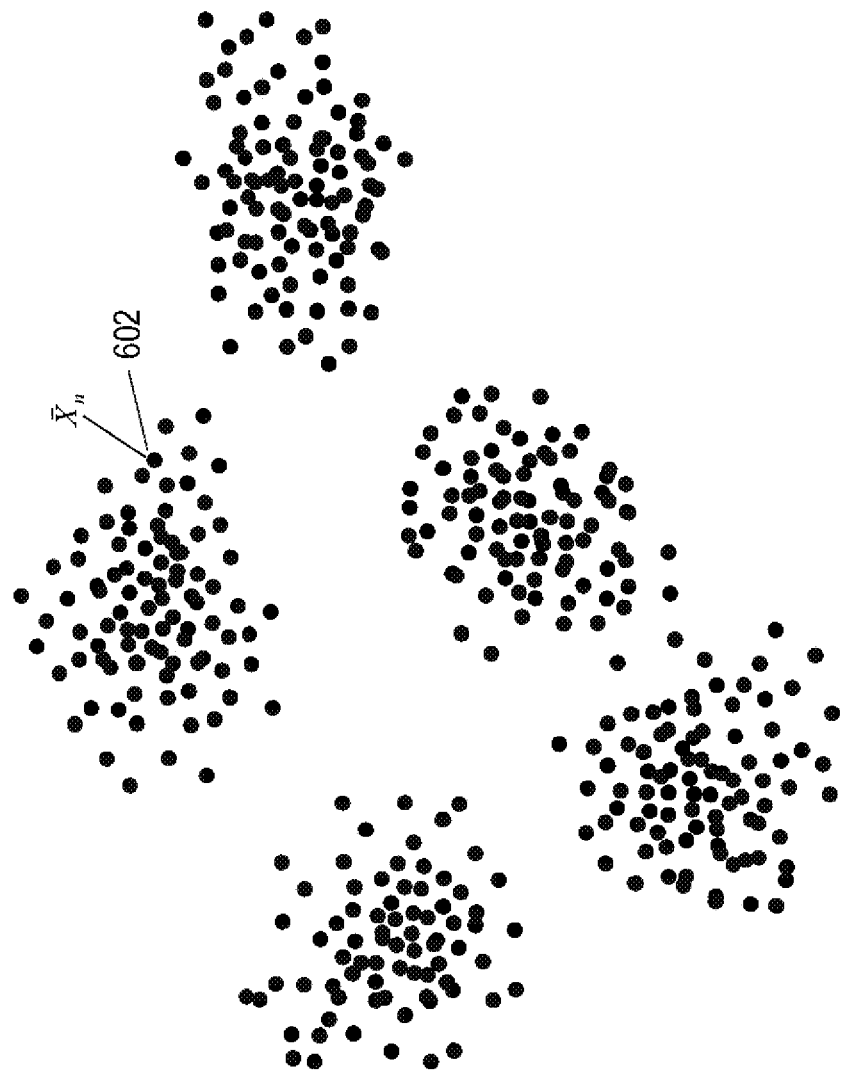
FIG. 6 shows an example plot of data points in a multi-dimensional space for a category of IT equipment.

FIG. 6 shows an example plot of N data points in an M-dimensional space of a category of IT equipment. Each dot, such as dot 602, represents an M-tuple of ordered equipment parameters given by:

$$\vec{X}_n = (X_{n,1}, X_{n,2}, \ldots, X_{n,M}, Y_n) \quad (1)$$

where n=1, 2, . . . , N.
The full set of data points associated with the category of IT equipment is given by:

$$X = \{\vec{X}_n\}_{n=1}^{N} \quad (2)$$

As shown in the Example of FIG. 6, the dots appear grouped together into four or five clusters. Each cluster of data points comprises similar IT equipment. Gaussian clustering is applied to the full set of data points X to determine different classes within the category of IT equipment. Gaussian clustering extends k-means clustering to determine an appropriate number of clusters. Gaussian clustering begins with a small number, k, of cluster centers and iteratively increases the number of cluster centers until the data in each cluster is distributed in accordance with a Gaussian distribution about the cluster center. The number of initial clusters can be set to a few as one. K-means clustering is applied to the full set of data points X for cluster centers denoted by $\{\vec{q}_j\}_{j=1}^{k}$. The locations of the k cluster centers are recalculated with each iteration to obtain k clusters. Each data point $\vec{X}_n$ is assigned to one of the k clusters defined by:

$$C_i^{(m)} = \{\vec{X}_n : |\vec{X}_n - \vec{q}_i^{(m)}| \le |\vec{X}_n - \vec{q}_j^{(m)}| \forall j, 1 \le j \le k\} \quad (3)$$

where
$C_i^{(m)}$ is the i-th cluster i=1, 2, . . . , k; and
m is an iteration index m=1, 2, 3, . . . .
The value of the cluster center $\vec{q}_i^{(m)}$ is the mean value of the data points in the i-th cluster, which is computed as follows:

$$\vec{q}_i^{(m+1)} = \frac{1}{|C_i^{(m)}|} \sum_{\vec{X}_n \in C_i^{(m)}} \vec{X}_n \quad (4)$$

where $|C_i^{(m)}|$ is the number of data points in the i-th cluster.

For each iteration m, Equation (3) is used to determine if a data points $\vec{X}_n$ belongs to the i-th cluster followed by computing the cluster center according to Equation (4). The computational operations represented by Equations (3) and (4) are repeated for each value of m until the data points assigned to the k clusters do not change. The resulting clusters are represented by:

$$C_i = \{\vec{X}_p\}_{p}^{N_i} \quad (5)$$

where
N is the number of data points in the cluster $C_i$;
i=1, 2, . . . , k;
p is a cluster data point subscript; and
$x = C_1 \cup C_2 \cup \ldots \cup C_k$.
The number of data points in each cluster sums to N (i.e., $N = N_1 + N_2 + \ldots + N_k$)

Figure 7A:
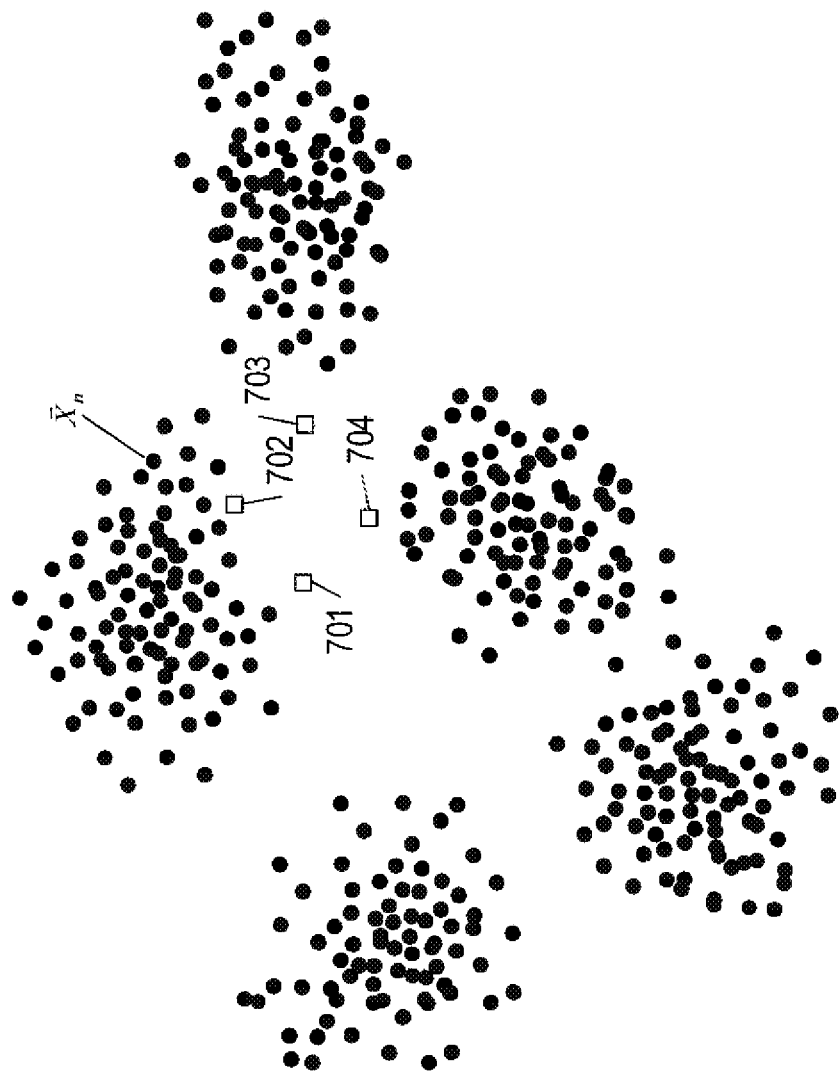
FIGS. 7A-7C shows an example of k-means clustering.
Figure 7B:
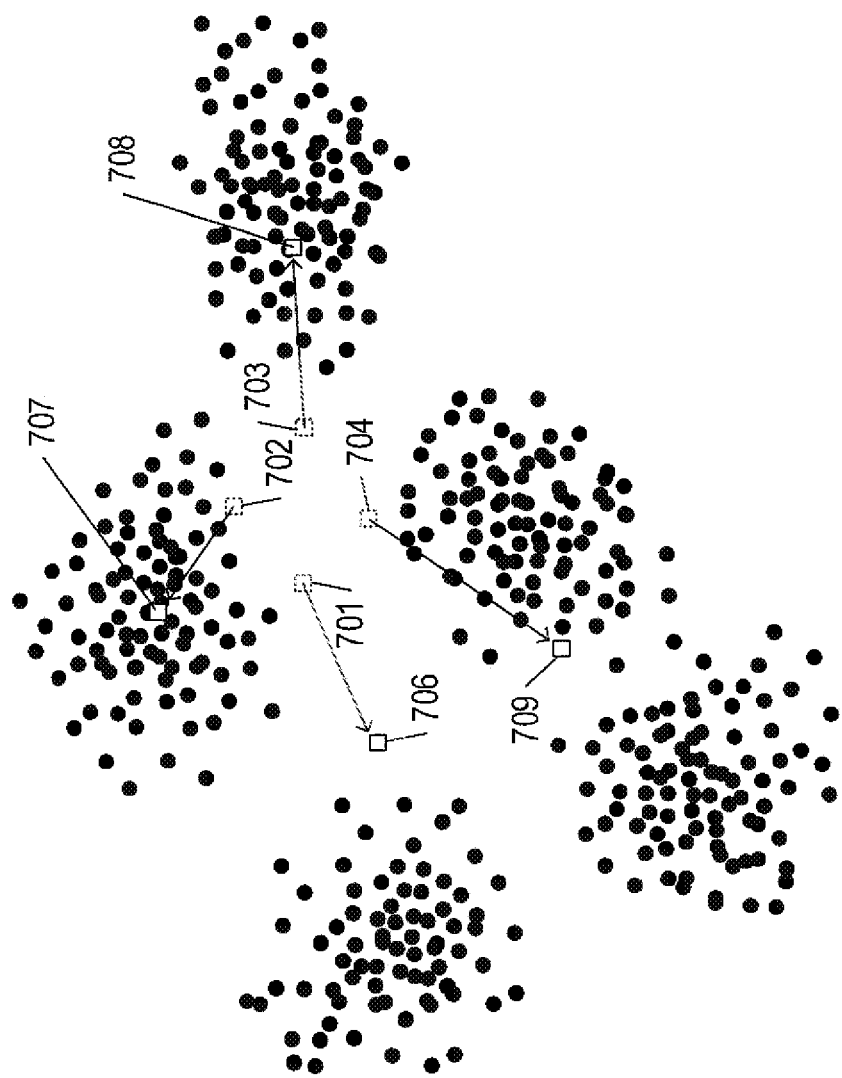
Figure 7C:
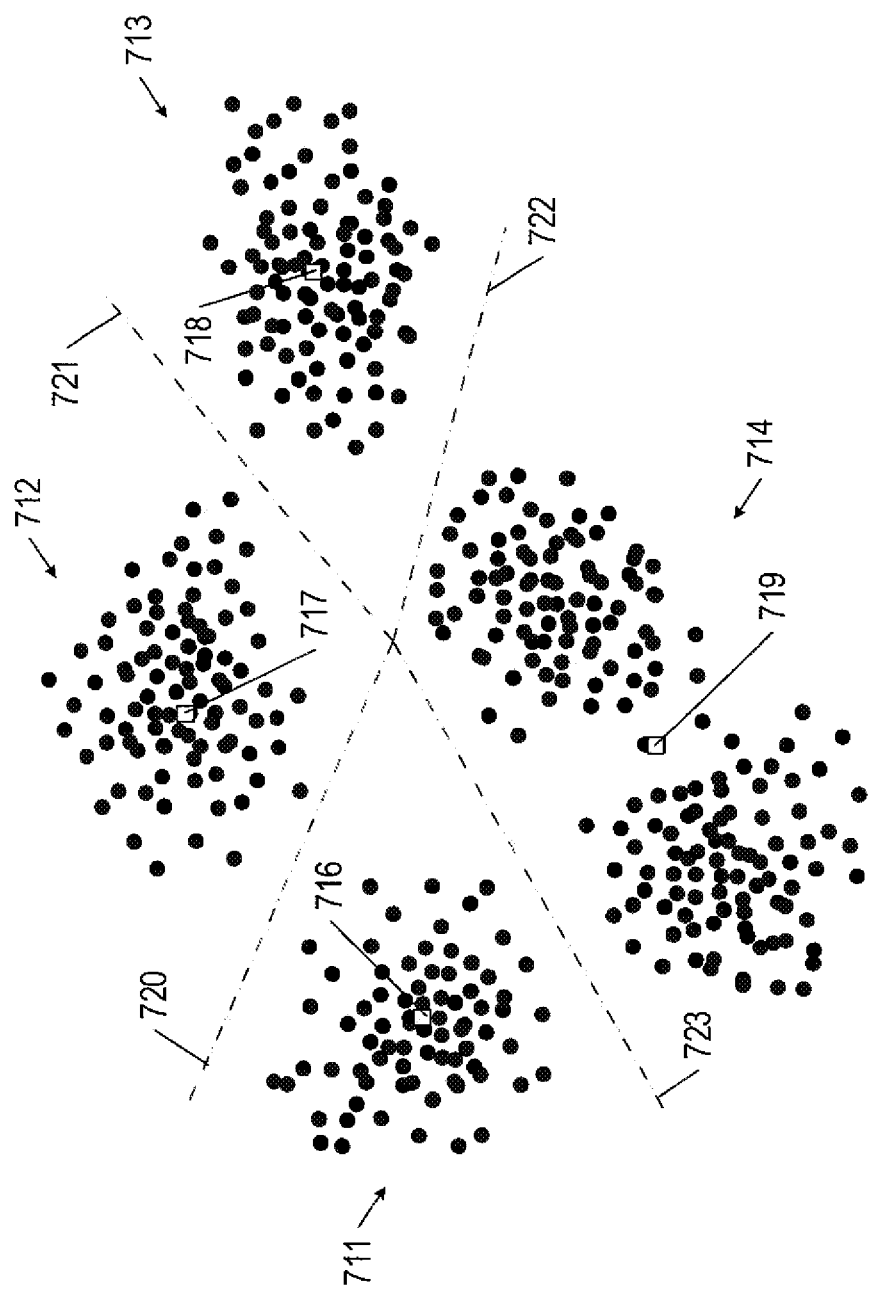

FIG. 7A shows an example of locations for an initial set of k=4 cluster centers represented by squares 701-704. The four cluster centers 701-704 may be placed anywhere within the M-dimensional space. K-means clustering as described above with reference to Equation (3) and (4) is applied until each of the data points have been assigned to one of four clusters. FIG. 7B shows a snapshot of an intermediate step in k-means clustering in which the cluster centers have moved from initial locations 701-704 to intermediate locations represented by squares 706-709, respectively. FIG. 7C shows a final clustering of the data points into four clusters 711-714 with cluster centers 716-719 located at the center of each of the four clusters for k-mean clustering with k=4. Dot-dash lines 720-723 have been added to mark separation between the four clusters 711-714.

Each cluster is then tested to determine whether the data assigned to a cluster are distributed according to a Gaussian distribution about the corresponding cluster center. A significance level, a, is selected for the test. For each cluster $C_i$, two child cluster centers are initialized as follows:

$$\vec{q}_i^+ = \vec{q}_i + \vec{m} \quad (6a)$$

$$\vec{q}_i^- = \vec{q}_i - \vec{m} \quad (6b)$$

In one implementation, the vector $\vec{m}$ is an M-dimensional randomly selected vector with the constraint that the length $\|\vec{m}\|$ is small compared to distortion in the data points of the cluster. In another implementation, principle component analysis is applied to data points in the cluster $C_i$ to determine the eigenvector $\vec{s}$ with the largest eigenvalue $\lambda$. The eigenvector $\vec{s}$ points in the direction of greatest spread in the cluster of data points and is identified by the corresponding largest eigenvalue $\lambda$. In this implementation, the vector $\vec{m} = \vec{v}\sqrt{2\lambda/\pi}$.

K-means clustering, as described above with reference to Equations (3) and (4), is then applied to data points in the cluster $C_i$ for the two child cluster centers $\vec{q}_i^+$ and $\vec{q}_i^-$. The two child cluster centers are relocated to identify two sub-clusters of the original cluster $C_i$. When the final iteration of k-means clustering applied to data points in the cluster $C_i$ is complete, the final relocated child cluster centers are denoted by $\vec{q}_i^{+\prime}$ and $\vec{q}_i^{-\prime}$, and M-dimensional vector is formed between the relocated child cluster centers $\vec{q}_i^{+\prime}$ and $\vec{q}_i^{-\prime}$ as follows:

$$\vec{v} = \vec{q}_i^{+\prime} - \vec{q}_i^{-\prime} \quad (7)$$

The data points in the cluster $C_i$ are projected onto a line defined by the vector $\vec{v}$ as follows: $\vec{v}$ $$X'_p = \frac{\overline{X}_p \cdot \vec{v}}{\|\vec{v}\|} \quad (8)$$

A set of projected data points $$C'_i = \{X'_p\}_p^{N_i} \quad (9)$$

The projected data points lie along the vector $\vec{v}$. The projected data points are transformed to zero mean and a variance of one by applying Equation (10) as follows:

$$X'_{(p)} = \frac{X'_p - \mu}{V} \quad (10)$$

The mean of the projected data points is given by $$\mu = \frac{1}{N_i} \sum_p^{N_i} X'_p \quad (11)$$

The variance of the projected data points is given by:

$$V = \frac{1}{N_i} \sum_p^{N_i} (X'_p - \mu)^2 \quad (12)$$

The set of projected data points with zero mean and variance of one is given by:

$$C'_{(i)} = \{X'_{(p)}\}_p^{N_i} \quad (13)$$

The cumulative distribution function for a normal distribution with zero mean and variance one. N(0,1), is applied to the projected data points in Equation (13) to compute a distribution of projected data points:

$$Z_{(i)} = \{z_p\}_p^{N_i} \quad (14)$$

where $$z_p = \frac{1}{2}\left[1 + \mathrm{erf}\left(\frac{X'_{(p)}}{\sqrt{2}}\right)\right]$$

A statistical test value is computed for the distribution of projected data points:

$$A_*^2(Z_{(i)}) = A(Z_{(i)})\left(1 + \frac{4}{N_i} - \frac{25}{N_i^2}\right) \quad (15)$$

where $$A(Z_{(i)}) = -\frac{1}{N_i} \sum_{p=1}^{N_i} (2p-1)[\ln(z_p) + \ln(1 - z_{N_i+1-p})] - N_i$$

When the statistical test value is less than the significance level represented by the condition $$A_*^2(Z_{(i)}) < \alpha \quad (16)$$

the relocated child cluster centers $\vec{q}_i^{+\prime}$ and $\vec{q}_i^{-\prime}$ are rejected and the original cluster center $\vec{q}_i$ is accepted. On the other hand, when the condition in Equation (16) is not satisfied, the original cluster center $\vec{q}_i$ is rejected and the relocated child cluster centers $\vec{q}_i^{+\prime}$ and $\vec{q}_i^{-\prime}$ are accepted as the cluster centers of two sub-clusters of the original cluster.

Figure 8A:
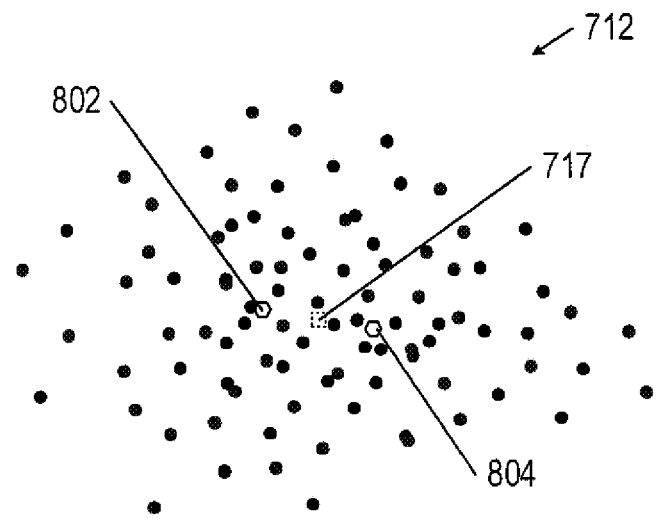
FIGS. 8A-8B show an example application of Gaussian clustering applied to a cluster identified in FIG. 7C.
Figure 8B:
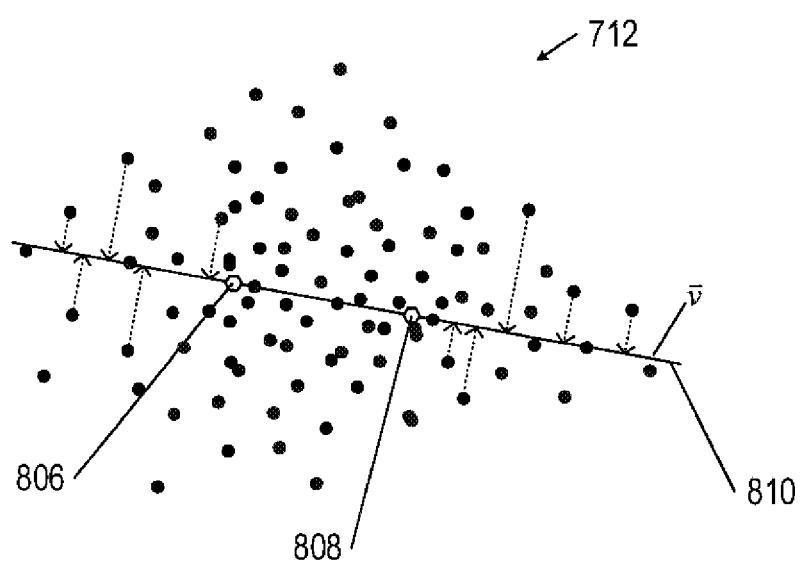

FIGS. 8A-9B show application of Gaussian clustering to the clusters 712 and 714 shown in FIG. 7C. FIG. 8A shows an enlargement of the cluster 712 in FIG. 7C. Hexagonal shapes 802 and 804 represent initial coordinate locations of two child cluster centers determined as described above with reference to Equations (6a) and (6b). K-means clusters is applied to the data points in the cluster 712 for k=2, as described above with reference to Equations (3) and (4). FIG. 8B shows child cluster centers 806 and 808 that result from application of k-means clustering. Line 810 is a line in the direction of a vector $\vec{v}$ formed between the two child cluster centers 806 and 808 as described above with reference to Equation (7). Dotted directional arrows represent projection of the data points onto the line 810 as described above with reference to Equation (8). In this example, when the cumulative distribution function for zero mean and variance one of Equation (14) is applied to the cluster of projected data points along the line 810, the statistical test value would satisfy the condition given by Equation (16) because the data are not Gaussian distributed about the two child cluster centers 806 and 808. As a result, the two child cluster centers 806 and 808 would be rejected and the original cluster center 717 would be retained as the cluster center of the cluster 712.

Figure 9A:
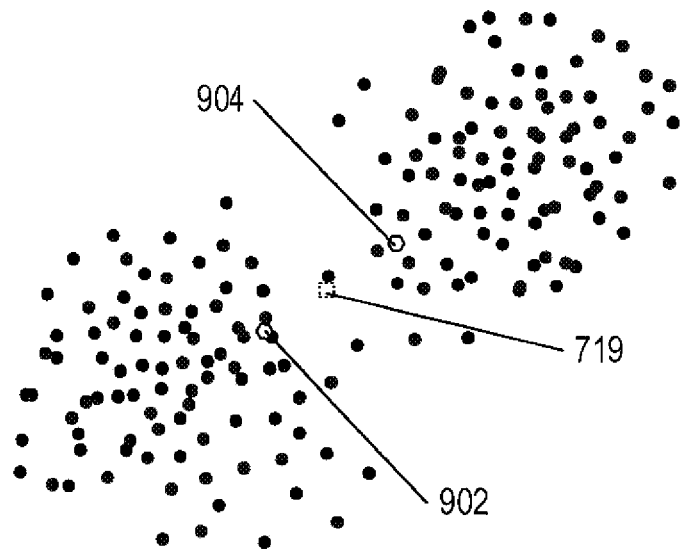
FIGS. 9A-9B show an example application of Gaussian clustering applied to a cluster identified in FIG. 7C.
Figure 9B:
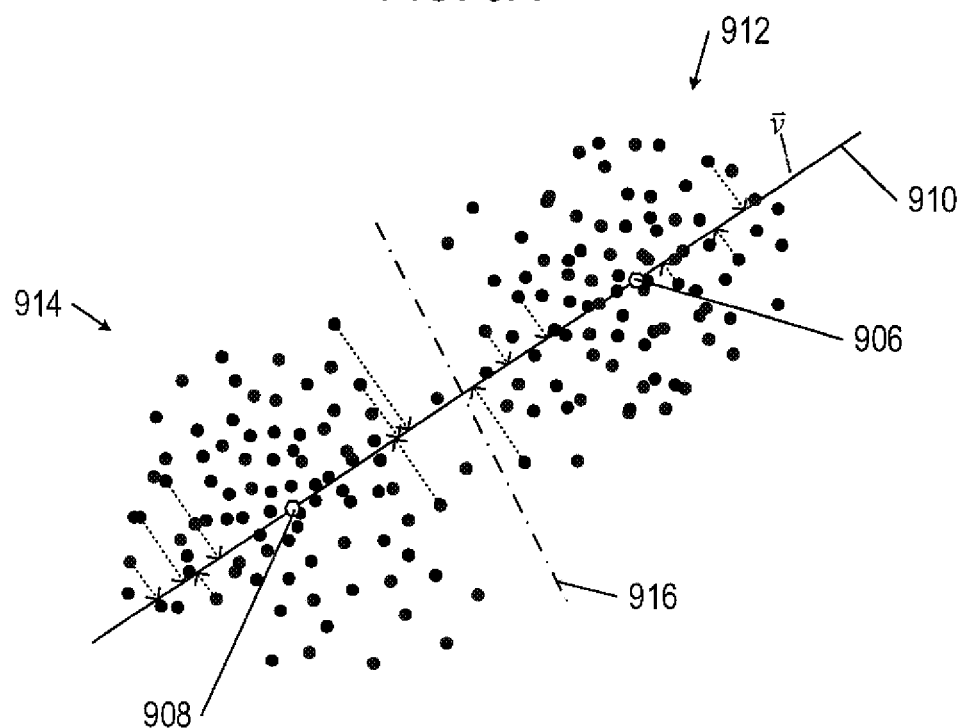

FIG. 9A shows an enlargement of the cluster 714 in FIG. 7C. Hexagonal shapes 902 and 904 represent initial coordinate locations of two child cluster centers determined as described above with reference to Equations (6a) and (6b). K-means clusters is applied to the data points in the cluster 714 for k=2, as described above with reference to Equations (3) and (4). FIG. 9B shows child cluster centers 906 and 908 that result from the application of k-means clustering. Line 910 is a line in the direction of a vector $\vec{v}$ formed between the two child cluster centers 906 and 908 as described above with reference to Equation (7). Dotted directional arrows represent projecting the data points onto the line 910 as described above with reference to Equation (8). In this example, when the cumulative distribution function for zero mean and variance one of Equation (14) is applied to the cluster of projected data points along the line 910, the statistical test value would not satisfy the condition given by Equation (16) because the data points are Gaussian distributed about the two child cluster centers 906 and 908. As a result, the two child cluster centers 806 and 808 would be retained to form two new clusters 912 and 914 that result from applying k-means clustering to the two cluster centers 906 and 908. Dot-dash line 916 marks separation between the clusters 912 and 914. The same procedure would then be applied separately to the clusters 912 and 914.

Figure 10:
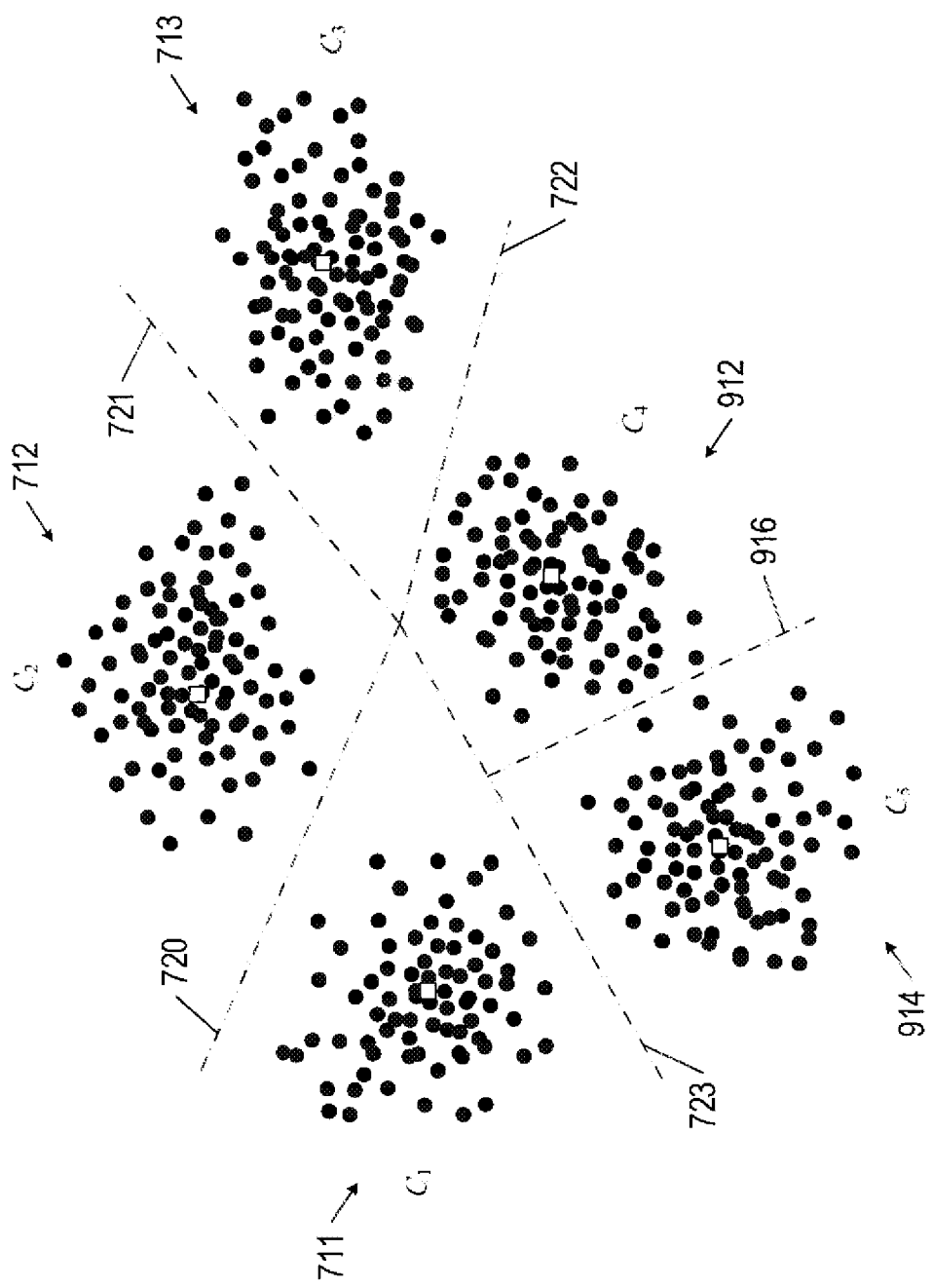
FIG. 10 shows a set of data points with five clusters.

FIG. 10 shows the full set of data points X clustered into five clusters 711-713, 912, and 914 obtained with Gaussian clustering. Each cluster of data points represents a different class of IT equipment within the larger category of IT equipment. For example, if the data points represent ordered equipment parameters of server computers of a data center, then each cluster represents a different class in the category of server computers. The classes represented by the clusters 711, 712, 713, 912, and 914 may be extra small, small, medium, large, and extra-large server computers based on each server's equipment parameters. The configuration parameters of extra-large server computers may be represented by data points in the cluster 914. Extra-large server computers have the highest CPU capacity, largest number of cores, largest amount of memory, and most network cards of the server computers in the data center. At the other end of the spectrum of server computers, the configuration parameters of extra-small server computers may be represented by data points in the cluster 711. Extra-small server computers have the lowest CPU capacity, fewest cores per CPU, least amount of memory, and fewest network cards. Clusters 712, 713, and 912 represent clusters with different combinations of CPU capacity, number of cores, amount of memory, and number of network cards.

Figure 11:
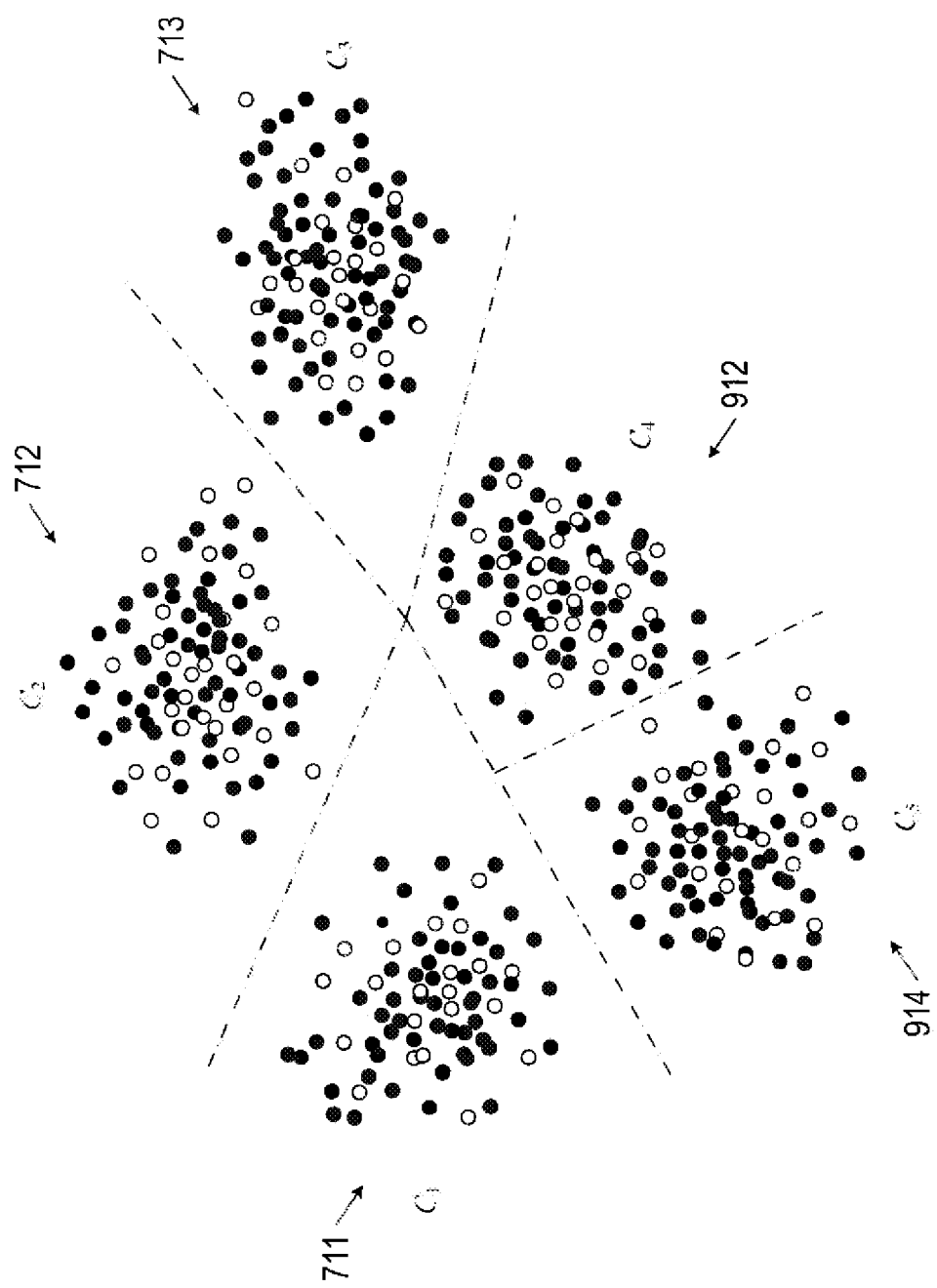
FIG. 11 shows the clusters of FIG. 10 partitioned into training data represented by solid black dots and validation data represented by open dots.

Each cluster $N_i$ of data points is partitioned into training data with L data points and validation data with $N_i-L$ data points, with the validation data set having fewer data points. Each cluster may be partitioned by randomly selecting data points to serve as training data while the remaining data points are used as validation data. For example, in certain implementations, each cluster of data points may be partitioned into 70% training data and 30% validation data. In other implementations, each cluster of data points may be partitioned into 80% training data and 20% validation data. In still other implementations, each cluster of data points may be partitioned into 90% training data and 10% validation data. FIG. 11 shows the five clusters of FIG. 10 partitioned into 70% training data represented by solid black dots and 30% validation data represented by open dots.

The L training data points are used to construct a generalized linear model for each class (i.e., cluster) of IT equipment. FIG. 12A shows equipment parameters for L sets of training data. The L sets of training data are randomly selected from the $N_i$ data points of a class of IT equipment, as described above with reference to FIG. 11. The known equipment parameters of each data point in the training data are referred to as "regressor parameters." The values $Y_1, Y_2, \ldots, Y_L$ are called response parameters that depend on the regressor parameters. For example, consider the class of medium size server computers discussed above. The regressor parameters in the tables of FIG. 12A are configuration and encoded parameters of L sets of training data of L medium server computers. Examples of the different values the response parameters $Y_1, Y_2, \ldots, Y_L$ can represent include costs, amount of memory, CPU capacity, and number of cores of the L medium server computers.

A generalized linear model is represented by $$h(\mu_l) = \beta_0 + \beta_1 X_{l,1} + \beta_2 X_{l,2} + \ldots + \beta_M X_{l,M} \tag{17}$$

where $\beta_0, \beta_1, \beta_2, \ldots, \beta_M$ are predictor coefficients;

$X_{l,1}, X_{l,2}, \ldots, X_{l,M}$ represent regressor parameters of the l-th data point set of L training data;

$\mu_l$ is a linear predictor for the i-th class of IT equipment; and $h(\cdot)$ is a link function that links the linear predictor, predictor coefficients, and the regressor parameters.

FIG. 12B shows a system of equations formed from the regressor parameters associated with each set of training data as described above with reference to Equation (17). Each equation comprises the same set of predictor coefficients and corresponds to one set of the training data shown in FIG. 12A. FIG. 12C shows the system of equations of FIG. 12B rewritten in matrix form. A link function is determined from the training data for each cluster.

The response parameters $Y_1, Y_2, \ldots, Y_L$ are dependent variables that are distributed according to a particular distribution, such as the normal distribution, binomial distribution, Poisson distribution, and Gamma distribution, just to name a few. The linear predictor is the expected value of the response parameter given by:

$$\mu_l = E(Y_l) \tag{18}$$

Examples of link functions are listed in the following Table:

| Link Function | $\eta_l = h(\mu_l)$ | $\mu_l = h^{-1}(\eta_l)$ |
| --- | --- | --- |
| Identity | $\mu_l$ | $\mu_l$ |
| Log | $\ln(\mu_l)$ | $e^{h(\mu_l)}$ |
| Inverse | $\mu_l^{-1}$ | $h(\mu_l)^{-1}$ |
| Inverse-square | $\mu_l^{-2}$ | $h(\mu_l)^{-1/2}$ |
| Square-root | $\sqrt{\mu_l}$ | $h(\mu_l)^2$ |

For example, when the response parameters are distributed according to a Poisson distribution, the link function is the log function. When the response parameters are distributed according to a Normal distribution, the link function is the identity function.

Figure 13:
FIG. 13 shows five clusters of data points with corresponding predictor coefficients and link functions.

The system of equations in FIGS. 12B and 12C is solved separately for each cluster to obtain a corresponding set of predictor coefficients. FIG. 13 shows the five clusters 711-713, 912, and 914 of data points and corresponding predictor coefficients $\beta_0^i, \beta_1^i, \beta_2^i, \ldots, \beta_M^i$ and link functions $h^i$, where superscript cluster index $i=1, \ldots, 5$. For each cluster, the predictor coefficients can be iteratively determined with the r-th iteration given by:

$$\beta_m^{(r+1)} = \beta_m^{(r)} + S(\beta_m^{(r)}) E(H(\beta_m^{(r)})) \tag{19}$$

where $m=1, \ldots, M$;

$S(\beta_m^{(r)})$ is a Taylors expansion of $\beta_m^{(r)}$; and $H(\beta_m^{(r)})$ is the Hessian matrix of $\beta_m^{(r)}$.

After the
The predictor coefficients can be computed iteratively using iterative weighted least squares. The validation data is used to validate the iteratively computed prediction parameters. Consider a set of predictor coefficients $\beta_1^j, \beta_2^j, \ldots, \beta_M^j$ obtained for the j-th cluster using the training data of the j-th cluster. Let the validation data for a validation data point in the j-th cluster be represented by the regressors $X_1^j, X_2^j, \ldots, X_M^j$ and a response parameter $Y^j$. The regressors are substituted into the generalized linear model to obtain an approximate response parameter as follows:

$$Y_0^j = h^{-1}(\beta_0^j + \beta_1^j X_1^j + \beta_2^j X_2^j + \ldots + \beta_M^j X_M^j) \tag{20a}$$

where $Y_0^j$ is the approximate response parameter of the actual response parameter $Y^j$.

The operation of Equation (20a) is repeated for the regressors of each of the $N_j-L$ validation data points in the j-th cluster to obtain a set of corresponding approximate response parameters $$\vec{Y}_0 = \{Y_0^1, Y_0^2, \ldots, Y_0^{N_j-L}\}$$

The set of actual response parameters of the regressors in the validation data are given by $$\vec{Y} = \{Y^1, Y^2, \ldots, Y^{N_j-L}\}$$

When the approximate response parameters for the validation data satisfy the condition $$\|\vec{Y}_0 - \vec{Y}\| < \varepsilon \tag{20b}$$

where

∥•∥ is the Euclidean distance; and

ε is an acceptable threshold (e.g., e=0.01).

the iteratively determined predictor coefficients of the cluster are acceptable for use in computing an unknown response parameter of an identified piece of IT equipment that belongs to the cluster.

The predictor coefficients and link function can be used to compute an unknown response parameter of an identified piece of IT equipment in a category of IT equipment. For each class of IT equipment, a sum of square distances is computed from the known regressor parameters of the identified piece of IT equipment to the regressor parameters of each piece of IT equipment in each class as follows:

$$D_i = \sum_{n=1}^{N_i} \left\| \vec{X}^u - \vec{X}_n^i / Y_n^i \right\|^2 \quad (21)$$

where $\|\bullet\|^2$ is the square Euclidean distance in an M-dimensional space:

$\vec{X}_n^i / Y_n^i$ is the n-th data point in the cluster $C_i$ without the known response parameter $Y_n^i$; and $\vec{X}^u = (X_1^u, X_2^u, \ldots, X_M^u)$ is an M-tuple of the known regressor parameters for the piece of IT equipment.

The square distances between the identified piece of IT equipment with an unknown response is denoted by $\{D_1, D_2, \ldots, D_N\}$. The square distance can be rank ordered to determine the minimum square distance in the set of square distances denoted by:

$$D_j = \min\{D_1, D_2, \ldots, D_N\} \quad (22)$$

The identified piece of IT equipment belongs to the class of IT equipment with data points in the j-th cluster $C_j$. An approximation of the unknown response parameter of the piece of IT equipment is computed from the predictor coefficients of the j-th cluster $C_j$ as follows:

$$\tilde{Y} = h^{-1}(\beta_0^j + \beta_1^j X_1^u + \beta_2^j X_2^u + \ldots + \beta_M^j X_M^u) \quad (23)$$

For example, suppose configuration and encoded parameters are known for a server computer, but the cost the server computer is unknown.

Figure 14:
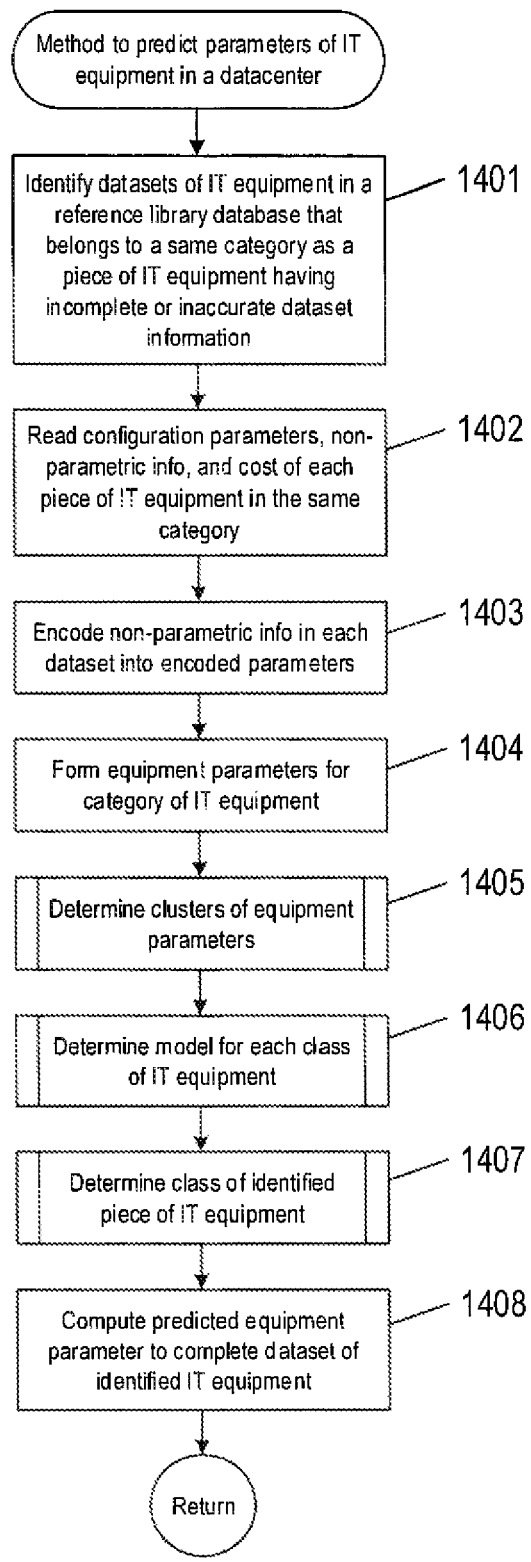
FIG. 14 shows a control-flow diagram of a method to predict parameters in a reference library of IT equipment of a data center.

FIG. 14 shows a control-flow diagram of a method to predict parameters in a reference library of IT equipment of a data center. In block 1401, identify datasets in a reference library database of IT equipment of a data center in a same category as a piece of IT equipment identified as having incomplete or inaccurate dataset information. In block 1402, datasets of configuration parameters, non-parametric information, and cost of each piece of IT equipment of the same category are read from the reference library database, as described above with reference to FIG. 3. In block 1403, non-parametric information in each dataset is encoded to obtain encoded parameters or values that represent the non-parametric information, as described above with reference to FIG. 4. In block 1404, form equipment parameters from the configuration parameters, non-parametric information, and cost for each piece of IT equipment, as described above with reference to FIG. 5. The equipment parameters of each piece of IT equipment corresponds to a data point in an M-dimensional space, as described above with reference to FIG. 6. In block 1405, a routine "determine clusters of equipment parameters" is called to cluster the data points that correspond to equipment parameters, as described above with reference to FIGS. 7A-7C. The IT equipment with equipment parameters (i.e., data points) in the same cluster are identified as being of the same class of IT equipment within the overall category of IT equipment as described above with reference to FIG. 10. In block 1406, a routine "determine model for each class of IT equipment" is called to compute a generalized linear model that characterizes the IT equipment within each class of IT equipment based on the equipment parameters of each class of IT equipment, as described above with reference to FIGS. 11 and 12. In block 1407, a routine "determine class of identified 1T equipment" is called to determine which of the classes of IT equipment the identified piece of IT equipment belongs to as described above with reference to Equation (19). In block 1408, a predicted equipment parameter is computed to complete the dataset of the identified IT equipment using the generalized linear model associated with the class of IT equipment the identified IT equipment belongs to.

Figure 15:
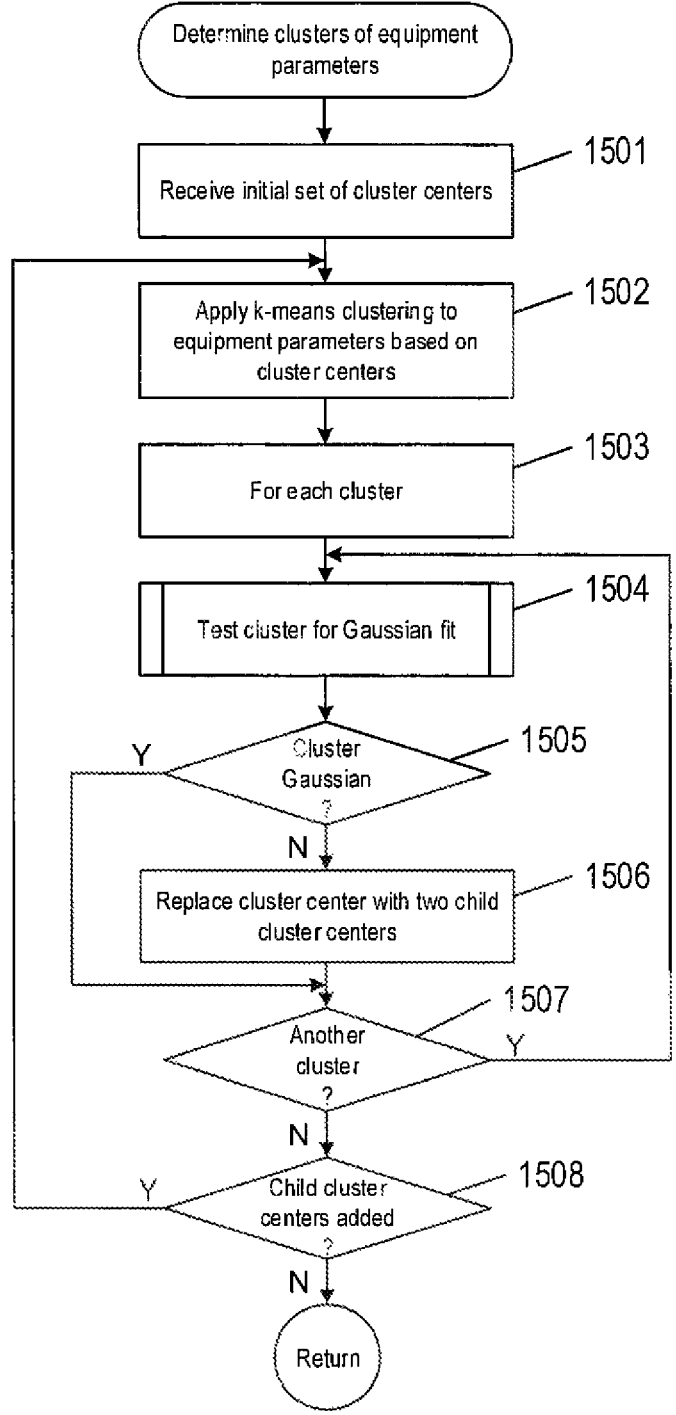
FIG. 15 shows a control-flow diagram of the routine "classify clusters of IT equipment" called in FIG. 14.

FIG. 15 shows a control-flow diagram of the routine "determine clusters of equipment parameters" called in block 1405 of FIG. 14. In block 1501, an initial set of cluster centers is received. The initial set of cluster centers are predetermined and may be initial to one (i.e., k=1). In block 1502, k-mean clustering is applied to the data points to determine clusters of data points as described above with reference to Equations (3) and (4). A loop beginning with block 1503 repeats the computational operations represented by blocks 1504-1506 for each cluster determined in step 1502. In block 1504, a routine "test cluster for Gaussian fit" is called to test cluster of data points for a fit to a Gaussian distribution. In decision block 1504, if the cluster identified in block 1504 is Gaussian, control flows to block 1507. Otherwise, control flows to block 1506 in which the cluster center of the cluster of data points is replaced by two child cluster centers obtained in block 1504. In decision block 1507, if all clusters identified in block 1502 have been considered, control flows to decision block 1508. In decision block 1508, if any cluster centers have been replaced by two child cluster centers, control flows to block 1502.

Figure 16:
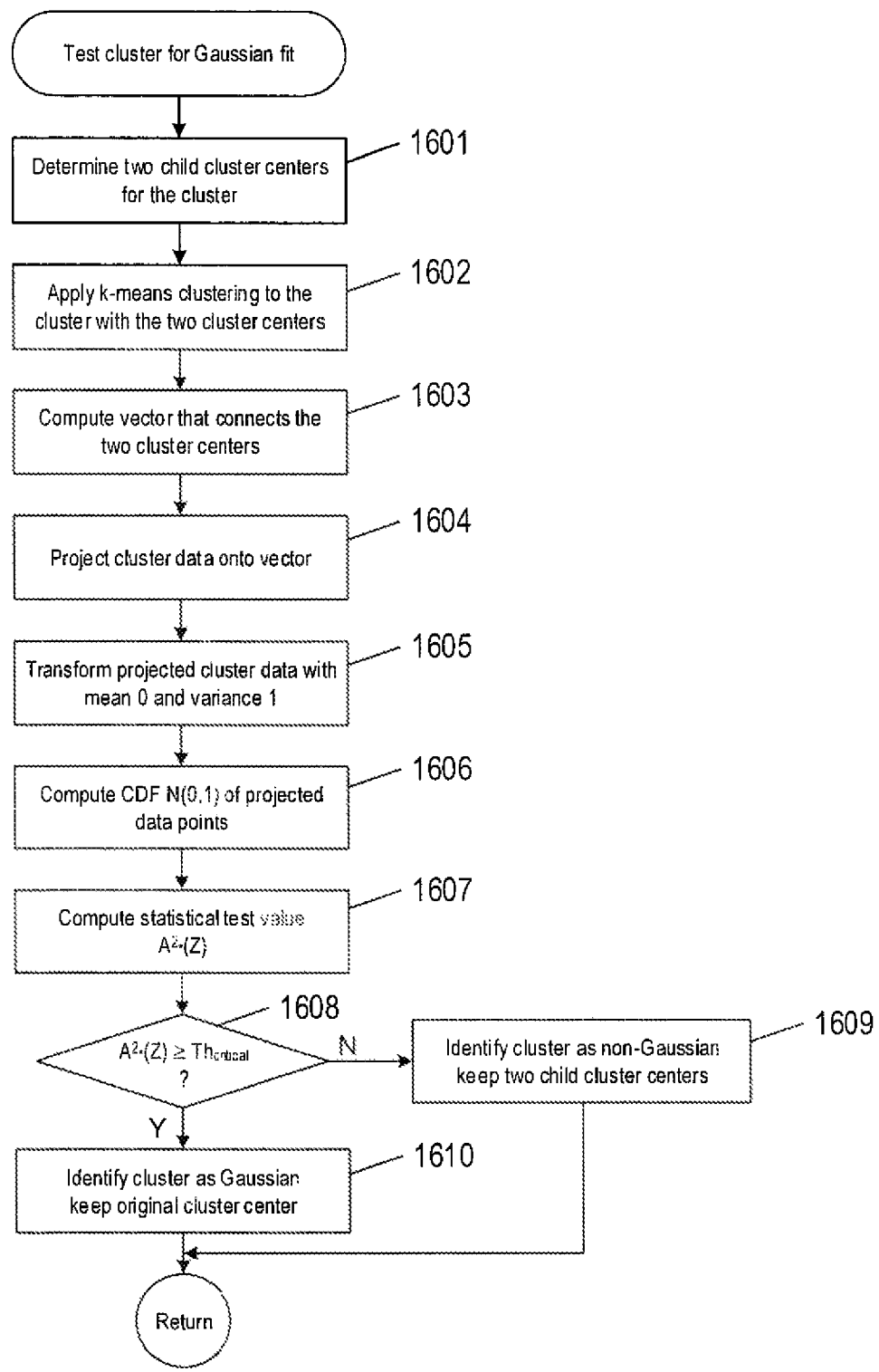
FIG. 16 shows a control-flow diagram of the routine "test cluster for Gaussian fit" called in FIG. 15.

FIG. 16 shows a control-flow diagram of the routine "test cluster for Gaussian fit" called in block 1504 of FIG. 15. In block 1601, two child cluster centers are determined for the cluster based on the cluster center in accordance with Equations (6a) and (6b). In block 1602, k-means clustering is applied to the cluster using the child cluster centers to identify two clusters within the cluster, each cluster having one of the relocated child cluster centers. In block 1603, compute a vector that connects the relocated two child cluster centers in accordance with Equation (7). In block 1604, the data points of the cluster are projected onto a line defined by the vector in accordance with Equation (8). In block 1605, the projected cluster data points are transformed to data points with a mean zero and variance one as described above with reference to Equations (10)-(12). In block 1606, the normal cumulative distribution function with zero mean and variance one is applied to the projected data points as described above with reference to Equation (14) to obtain a distribution of projected data points. In block 1607, a statistical test value is computed from the distribution of projected data points according to Equation (15). In decision block 1608, when the statistical test value is greater than a critical threshold, as described above with reference to Equation (16), control flows block 1610. Otherwise, control flows to block 1609. In block 1609, the cluster is identified as non-Gaussian and two relocated child cluster centers are used to replace the original cluster center. In block 1610, the cluster is identified as Gaussian and two relocated child cluster centers are rejected and the original cluster center is retained.

Figure 17:
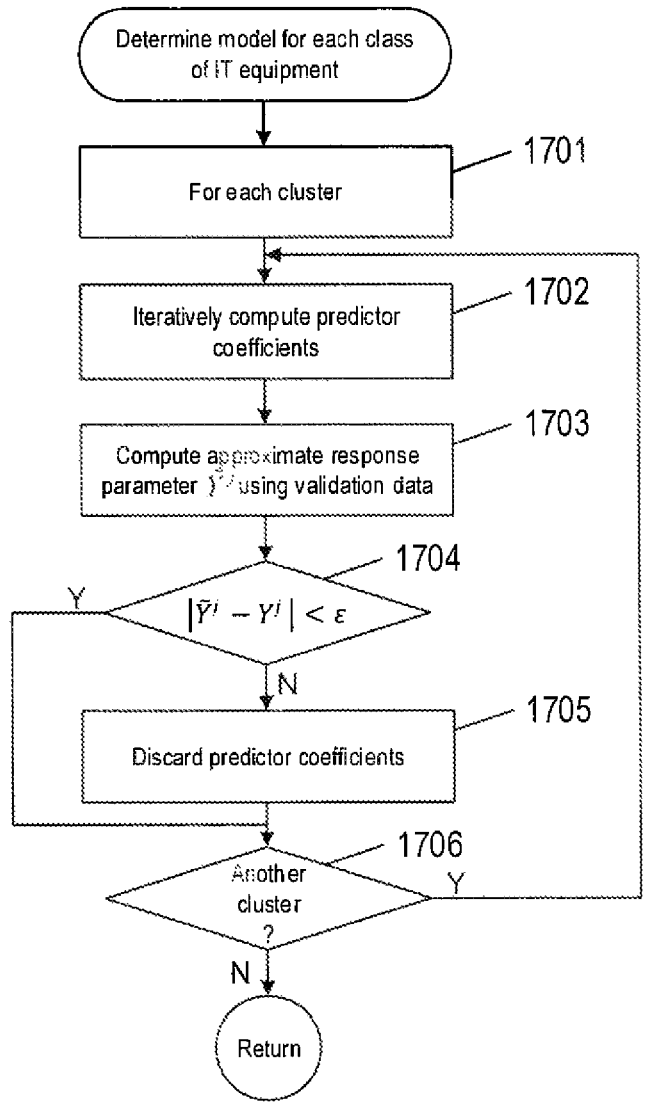
FIG. 17 shows a control-flow diagram for the routine "determine model for each class of IT equipment" called in FIG. 14.

FIG. 17 shows a control-flow diagram for the routine "determine model for each class of IT equipment" called in block 1406 of FIG. 14. A loop beginning with block 1701 repeats the computational operation of block 1702 for each cluster determined in block 1405 of FIG. 14. In block 1702, iteratively computer predictor coefficients, as described above with reference to Equation (19). In block 1703, compute approximate response using generalized linear model with validation data to obtain approximate equipment parameter, as described above with reference to Equation (20a). In decision block 1704, when the condition of Equation (20b) is satisfied for the approximate equipment parameter and the equipment parameter of the validation data, control flow to decision block 1706. Otherwise, control flows to block 1705. In block 1705, the predictor coefficients are discarded. In decision block 1706, controls flow back to block 1702 for another cluster.

Figure 18:
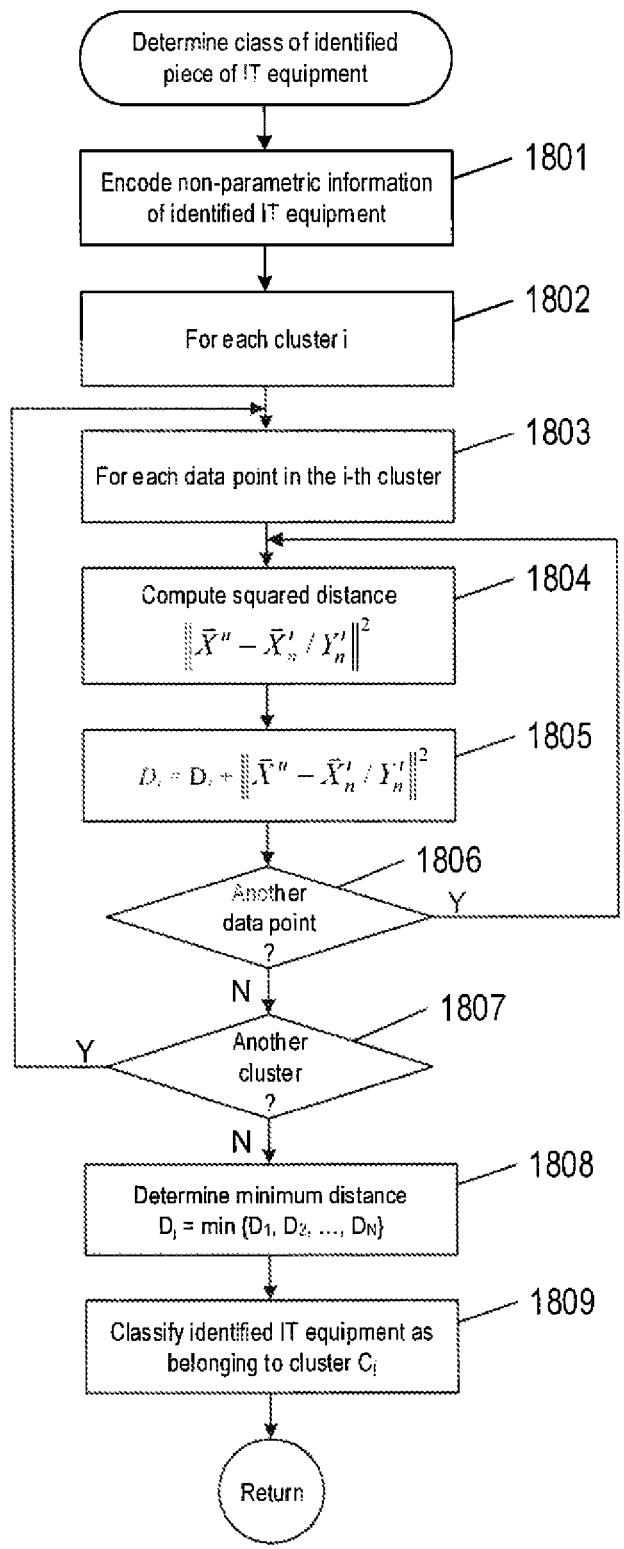
FIG. 18 shows a control-flow diagram for the routine "identify class of discovered IT equipment" called in FIG. 14.

FIG. 18 shows a control-flow diagram for the routine "determine class of identified IT equipment" called in block 1407 of FIG. 14. In block 1801, non-parametric information of the identified piece of IT equipment is encoded as described above with reference to FIG. 4 to obtain equipment parameters. A loop beginning with block 1802 repeats the computational operations represented by blocks 1803-1806 for each cluster determined in block 1405 of FIG. 14. A loop beginning with block 1803 repeats the computational operations represented by blocks 1804 and 1805 for each data point in the cluster. In block 1804, a square distance is computed as described above with reference to Equation (19) between a data point of cluster and a corresponding equipment parameter of the equipment parameters of the identified piece of IT equipment. In block 1805, a sum of the square distances computed in block 1804 is formed. In decision block 1806, blocks 1804 and 1805 are repeated until all data points of the cluster have been considered. In decision block 1807, blocks 1803-1806 are repeated for another cluster until all clusters have been considered. In block 1808, a minimum of the square distances is determined as described above with reference to Equation (20). In block 1809, the identified piece of IT equipment is classified as being in the class of IT equipment with the minimum square distances to the identified piece of IT equipment.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system that completes information in a reference library database of a data center, the method comprising:
    for a piece of IT ("information technology") equipment identified as having incomplete dataset information in the reference library database, forming equipment parameters from configuration parameters and non-parametric information for each piece of IT equipment in a category of IT equipment associated with the piece of IT equipment;
    computing a model for each class of IT equipment based on the equipment parameters of the IT equipment;
    determining a class of the piece of IT equipment based on the model for each class of IT equipment; and
    completing information for the piece of IT equipment in the reference library database of IT equipment based on the class of the piece of IT equipment.

2. The method of claim 1 wherein forming the equipment parameters comprises:
    identifying datasets in the reference library database in the category of IT equipment, each dataset comprising configuration parameters and non-parametric information of each piece of IT equipment in the data center; and
    encoding non-parametric information in each dataset into encoded parameters that represent the non-parametric information.

3. The method of claim 1 wherein computing the model for each class of IT equipment comprises:
    clustering the equipment parameters based on an initial set of cluster centers to assign each equipment parameters to one of k clusters of equipment parameters; and
    for each cluster of the equipment parameters,
        testing the cluster of equipment parameters for fit to a Gaussian distribution,
        replacing cluster center with two child cluster centers when the cluster of equipment parameters do not fit a Gaussian distribution, and
        clustering the equipment parameters into two clusters based on the two child clusters.

4. The method of claim 1 where computing the model for each class of IT equipment comprises:
    for each class of IT equipment
        partitioning the equipment parameters associated with the class into training data and validation data,
        iteratively computing predictor coefficients of a model of the class of IT equipment based on the training data,
        computing approximate response parameters using the model applied to the validation data associated with the class, the approximate response parameters to approximate the actual response parameter of the validation data, and
        discarding the predictor coefficients when a difference between the approximate response parameters and corresponding response parameters of the validation data exceed a threshold.

5. The method of claim 1 wherein determining the class of the piece of IT equipment comprises:
    computing a squared distance between the piece of IT equipment and each piece of IT equipment based on the incomplete equipment parameters of the identified piece of IT equipment and corresponding equipment parameters of each piece of IT equipment;
    determining a minimum squared distance of the squared distances; and
    assigning the identified piece of IT equipment to the class of IT equipment with the piece of IT equipment having the minimum squared distance to the identified piece of IT equipment.

6. A system that completes information in a reference library database of a data center, the system comprising:
    one or more processors;
    one or more data-storage devices; and machine-readable instructions stored in the one or more data-storage devices that when executed using the one or more processors controls the system to perform operations comprising:

for a piece of IT ("information technology") equipment identified as having incomplete dataset information in the reference library database, forming equipment parameters from configuration parameters and non-parametric information for each piece of IT equipment in a category of IT equipment associated with the piece of IT equipment;

computing a model for each class of IT equipment based on the equipment parameters of the IT equipment;

determining a class of the piece of IT equipment based on the model for each class of IT equipment; and completing information for the piece of IT equipment in the reference library database of IT equipment based on the class of the piece of IT equipment.

7. The system of claim 6 wherein forming the equipment parameters comprises:

identifying datasets in the reference library database in the category of IT equipment, each dataset comprising configuration parameters and non-parametric information of each piece of IT equipment in the data center, and encoding non-parametric information in each dataset into encoded parameters that represent the non-parametric information.

8. The system of claim 6 wherein computing the model for each class of IT equipment comprises:

clustering the equipment parameters based on an initial set of cluster centers to assign each equipment parameters to one of k clusters of equipment parameters; and for each cluster of the equipment parameters,
testing the cluster of equipment parameters for fit to a Gaussian distribution,
replacing cluster center with two child cluster centers when the cluster of equipment parameters do not fit a Gaussian distribution, and
clustering the equipment parameters into two clusters based on the two child clusters.

9. The system of claim 6 where computing the model for each class of IT equipment comprises:

for each class of IT equipment
partitioning the equipment parameters associated with the class into training data and validation data,
iteratively computing predictor coefficients of a model of the class of IT equipment based on the training data,
computing approximate response parameters using the model applied to the validation data associated with the class, the approximate response parameters to approximate the actual response parameter of the validation data, and
discarding the predictor coefficients when a difference between the approximate response parameters and corresponding response parameters of the validation data exceed a threshold.

10. The system of claim 6 wherein determining the class of the piece of IT equipment comprises:

computing a squared distance between the piece of IT equipment and each piece of IT equipment based on the incomplete equipment parameters of the identified piece of IT equipment and corresponding equipment parameters of each piece of IT equipment;

determining a minimum squared distance of the squared distances; and assigning the identified piece of IT equipment to the class of IT equipment with the piece of IT equipment having the minimum squared distance to the identified piece of IT equipment.

11. A non-transitory computer-readable medium encoded with machine-readable instructions that implement a method carried out by one or more processors of a computer system to perform operations comprising:

for a piece of IT ("information technology") equipment of a data center identified as having incomplete dataset information in a reference library database of the data center, forming equipment parameters from configuration parameters and non-parametric information for each piece of IT equipment in a category of IT equipment associated with the piece of IT equipment;

computing a model for each class of IT equipment based on the equipment parameters of the IT equipment;

determining a class of the piece of IT equipment based on the model for each class of IT equipment; and completing information for the piece of IT equipment in the reference library database of IT equipment based on the class of the piece of IT equipment.

12. The medium of claim 11 wherein forming the equipment parameters comprises:

identifying datasets in the reference library database in the category of IT equipment, each dataset comprising configuration parameters and non-parametric information of each piece of IT equipment in the data center; and encoding non-parametric information in each dataset into encoded parameters that represent the non-parametric information.

13. The medium of claim 11 wherein computing the model for each class of IT equipment comprises:

clustering the equipment parameters based on an initial set of cluster centers to assign each equipment parameters to one of k clusters of equipment parameters; and for each cluster of the equipment parameters,
testing the cluster of equipment parameters for fit to a Gaussian distribution,
replacing cluster center with two child cluster centers when the cluster of equipment parameters do not fit a Gaussian distribution, and
clustering the equipment parameters into two clusters based on the two child clusters.

14. The medium of claim 11 where computing the model for each class of IT equipment comprises:

for each class of IT equipment
partitioning the equipment parameters associated with the class into training data and validation data,
iteratively computing predictor coefficients of a model of the class of IT equipment based on the training data,
computing approximate response parameters using the model applied to the validation data associated with the class, the approximate response parameters to approximate the actual response parameter of the validation data, and
discarding the predictor coefficients when a difference between the approximate response parameters and corresponding response parameters of the validation data exceed a threshold.

15. The medium of claim 11 wherein determining the class of the piece of IT equipment comprises:

computing a squared distance between the piece of IT equipment and each piece of IT equipment based on the incomplete equipment parameters of the identified piece of IT equipment and corresponding equipment parameters of each piece of IT equipment;
determining a minimum squared distance of the squared distances; and
assigning the identified piece of IT equipment to the class of IT equipment with the piece of IT equipment having the minimum squared distance to the identified piece of IT equipment.

* * * * *